United States Patent [19]

Nishida

[11] Patent Number: 4,875,261
[45] Date of Patent: Oct. 24, 1989

[54] BACK-UP ROLL IN A ROLLING MILL
[75] Inventor: Masahiro Nishida, Osaka, Japan
[73] Assignee: Koyo Seiko Co., Ltd., Osaka, Japan
[21] Appl. No.: 258,858
[22] Filed: Oct. 17, 1988
[30] Foreign Application Priority Data
  Oct. 28, 1987 [JP] Japan .............................. 62-165228
[51] Int. Cl.⁴ .............................................. B21B 27/00
[52] U.S. Cl. .................................. 29/116.1; 29/116.2; 29/130; 100/155 R; 100/160
[58] Field of Search ................... 29/116.1, 116.2, 123, 29/130; 72/241, 242, 243; 100/155 R, 160
[56] References Cited
U.S. PATENT DOCUMENTS
  4,325,170  4/1982  Verboom et al. ................ 29/116.2
  4,477,954 10/1984  Molinatto ...................... 29/116.1 X
  4,637,109  1/1987  Bryer ........................... 29/130 X
  4,709,629 12/1987  Appenzellet et al. ......... 29/116.2 X Primary Examiner—Howard N. Goldberg
Assistant Examiner—Irene Cuda
Attorney, Agent, or Firm—Wenderoth, Lind & Ponack

[57] ABSTRACT

A back-up roll in a rolling mill is provided with multiple cylindrical rollers fit circumferentially between a roll shaft of the back-up roll and an outer casing thereof, and a tapered roller bearing is provided between the roll shaft and outer casing and juxtaposed to said cylindrical rollers and which receives a thrust load acting on the cylindrical rollers. The tapered roller bearing is composed of an inner ring set to the outside of the roll shaft, an outer ring fixed to the inside of the outer casing and in contact with ends of the cylindrical rollers, and multiple tapered rollers fit between the inner and outer rings.

8 Claims, 3 Drawing Sheets

BACK-UP ROLL IN A ROLLING MILL

BACKGROUND OF THE INVENTION

The present invention relates to a back-up roll which suppresses the bending of a working roll of a rolling mill during rolling.

Bearing devices for back-up rolls in this type of rolling mill which are known from the prior art are as shown in FIG. 3. This bearing device which is disposed between a roll shaft 31 on a static side of a back-up roll and an outer casing 32 on a rolling side of the back-up roll has a pair of inner rings 34, 34 fit and fixed outside the roll shaft 31, said inner rings 34, 34 being separated by a spacer ring 33 on the outside of said roll shaft 31, and having fit on both ends circular side plates 35 and snap rings 36; on the inside of the aforementioned outer casing 32 is fit and secured a pair of outer rings 37, 37 facing the aforementioned inner rings 34, 34; on both ends of these outer rings are fit circular covers 38 which are fixed to the outer casing 32 with bolts 39, and between aforementioned inner rings 34, 34 and outer rings 37, 37 are cylindrical rollers 41, 41 connected by retainers 40. Furthermore, flanges 42 contacting the ends of cylindrical rollers 41 are formed at the outer ends of inner rings 34, 34 and at the outer ends, inner ends, and middle of outer rings 37, and the axial thrust load acting on cylindrical rollers 41 is received by these flanges 42.

It is known that because back-up rolls such as this are installed above and below a pair of work rolls, and that bending of the work rolls is corrected by sandwiching the work rolls between upper and lower outer casings 32 which rotate and apply a heavy load to the roll shafts of the top and bottom work rolls in the direction in which both shafts drift, a large radial load of an average 30 tons acts in the radial direction and a very large thrust load of an average 1.5 ton acts in the axial direction of the bearing device. However, as will be evident from FIG. 3, because the aforementioned conventional bearing device is constructed in such a manner that this very large thrust load is received only by flanges 42 which are formed extending slightly at the ends of the inner and outer rings 34 and 37, respectively, when the excessive thrust load frequently produced during rolling is received, flanges 42 may fail, fragments of the flanges 42 may be caught in cylindrical rollers 41, and the back-up roll itself may become inoperable.

SUMMARY OF THE INVENTION

The object of the present invention is to provide a back-up roll in a rolling mill which will not fail even when an excessive thrust load is received by so constructing an end section of the back-up roll in such a manner that a thrust load from a bearing device is dispersed and supported without stress concentration.

In order to achieve the object, a back-up roll in a rolling mill according to the present invention comprises a roll shaft of the back-up roll of the rolling mill; an outer casing disposed outside the roll shaft; multiple cylindrical rollers fit circumferentially between the roll shaft and the outer casing; and a tapered roller bearing which is provided between the roll shaft and outer casing and juxtaposed to said cylindrical rollers, and which receives a thrust load acting on said cylindrical rollers, wherein said tapered roller bearing is composed of an inner ring fit to an outside of said roll shaft, an outer ring fixed to an inside of said outer casing and in contact with ends of said cylindrical rollers, and multiple tapered rollers fit between the inner and outer rings.

When a thrust load in the axial direction acts between the roll shaft of the back-up roll and the outer casing during rolling, the load is applied to said outer ring in the axial direction from the cylindrical roller which moves between the outer casing and the roller shaft while in contact with one end of the outer ring of the tapered roller bearing fixed to the inside of the outer casing. Also, a part of a radial load which works continuously in the radial direction through the tapered roller bearing between the roll shaft and the outer casing during rolling is turned via the tapered rollers and inner ring of the tapered roller bearing set to the outside of said roll shaft and, as a result, acts toward the inside in the axial direction of the outer ring. Therefore, the thrust load acting on the outer ring from the cylindrical rollers is cancelled by a thrust load produced by the radial load acting on the outer ring from the tapered rollers; since the outer ring thus receives a comparatively uniform compressive stress with little stress concentration, it is harder for the device to fail when compared with conventional devices in which the thrust load is received directly by the flanges. Specifically, the thrust load from the cylindrical rollers is dispersed and supported by none other than the roll shaft and the outer casing via the outer ring, tapered rollers, and inner ring, the stress concentration acting on the bearing device is significantly lower, and the useful life of the bearing device can be extended.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
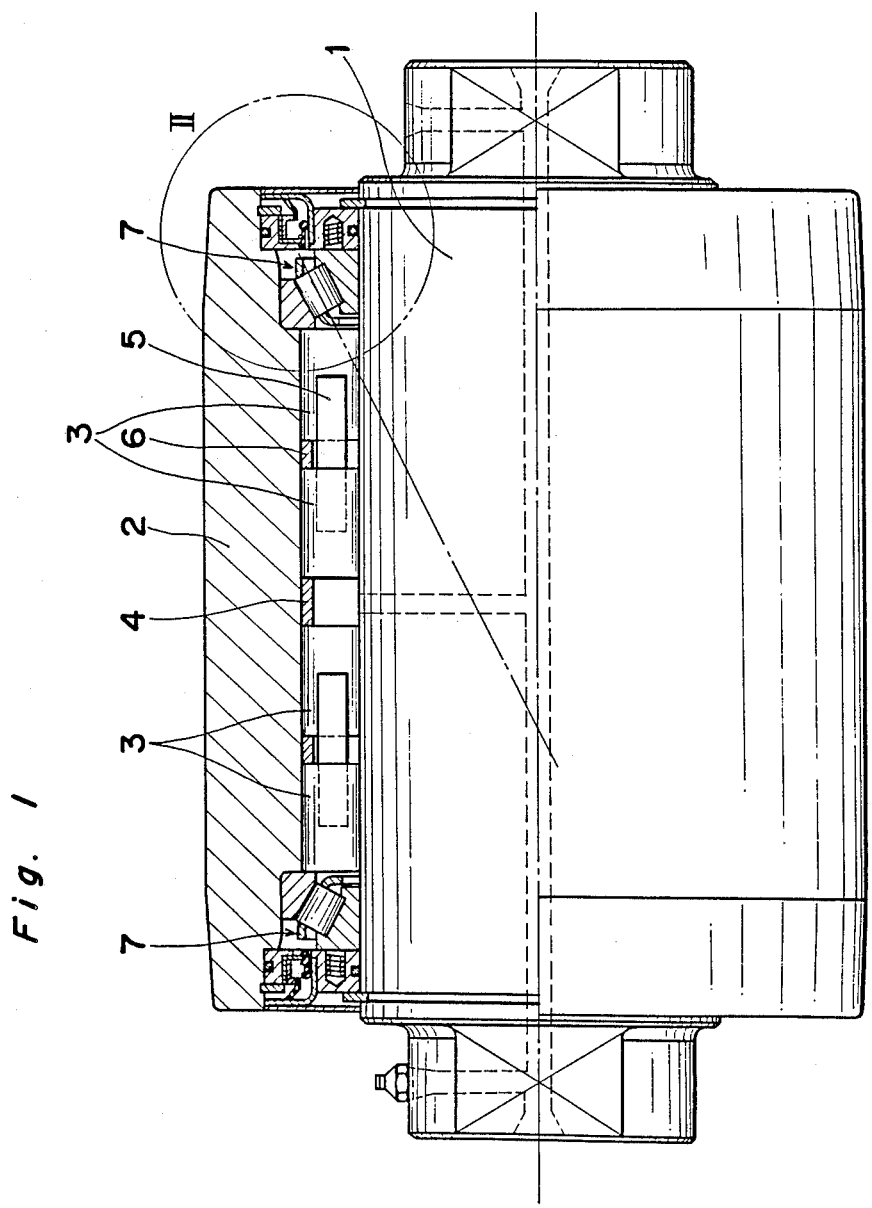
FIG. 1 is a partial cross-section side view of a back-up roll of a rolling mill which is a preferred embodiment of the present invention.

FIG. 1 is a partial cross-section side view of a back-up roll in a rolling mill which is a preferred embodiment of the present invention, and in which reference number 1 is a roll shaft on the static side of a back-up roll; 2 is an outer casing on the rotating side of the back-up roll and which is fit in a gap at the roll shaft; 3 is cylindrical rollers fit between the roll shaft 1 and outer casing 2 and separated by a floating inner ring 4; 5 is a retainer connecting the cylindrical rollers 3 in a continuous ring; 6 is an inner ring fit between pairs of cylindrical rollers 3, 3 connected by retainers 5; and 7 is a tapered roller bearing provided near an end of a cylindrical roller 3 between the roll shaft 1 and outer casing 2, and which receives the thrust load acting on the cylindrical rollers 3.

Figure 2:
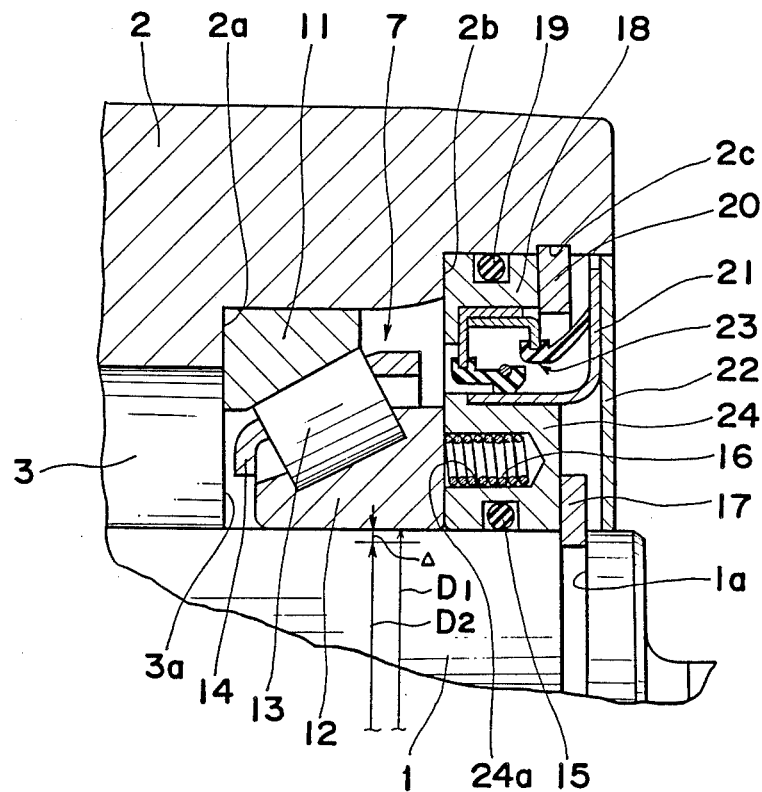
FIG. 2 is a detailed section of part II in FIG. 1.

As shown in the partial detailed diagram of FIG. 2, said tapered roller bearing 7 is composed of an outer ring 11 which is closely fit in a ring step 2a provided on the inside on the end of the outer casing 2 and which contacts an end surface 3a of the cylindrical roller 3, an inner ring 12 which is clearance fit to the outside of the roll shaft 1 opposite the outer ring 11, and tapered rollers 13 which are connected by a retainer 14 and fit between said inner and outer rings 12 and 11, respectively, so that the axes or center lines of the tapered rollers 13 intersect the axis of the roll shaft 1. The minimum gap between said roll shaft 1 and inner ring 12, i.e., the value Δ which develops by subtracting the maximum allowable outer diameter D2 from the minimum allowable hole diameter D1 of the inner ring 12, is, for example, 0.5 mm, so that the radial load is not applied to the inner ring 12 from the roll shaft 1. Further, a seal ring 24 with an O-ring 15 is fit to the roll shaft 1 from the outside of the clearance fit inner ring 12; said inner ring 12 is pressed towards the inside by coil springs 16 compressed in horizontal holes 24a of the seal ring 24, and the outside end of the seal ring 24 is engaged in the axial direction by a stop ring 17 fit in a ring channel 1a of the roll shaft 1. With this construction, the thrust load acting towards the outside in the axial direction from the cylindrical rollers 3 is transmitted and distributed to and born partly by the outer casing 2 via the outer ring 11, partly by the roll shaft 1 via the outer ring 11, tapered rollers 13, and inner ring 12, and also partly by the roll shaft 1 via the inner ring 12, seal ring 24, and stop ring 17.

On the other hand, a seal cover 18 with an O-ring 19 is fit inside a large diameter ring step 2b on the inside of the outer casing 2 outside the outer ring 11, and the outside face of this seal cover 18 is fixed in the axial direction by a stop ring 20 fit in a ring channel 2c on the inside of the outer casing 2. Furthermore, the gap between the seal cover 18 and seal ring 24 is covered with a ring-shaped slinger 21 having an L-shaped cross section affixed to the outer periphery of the seal ring 24; the space between the ends of the outer casing 2 and roll shaft 1 is covered with a ring-shaped side plate 22 which is fixed to the outside of the slinger 21; and a ring-shaped oil seal 23 composed of rubber or another material is fixed to the seal cover 18 in the space enclosed by the slinger 21.

The operation of the heretofore described back-up roll is described hereinbelow.

Figure 3:
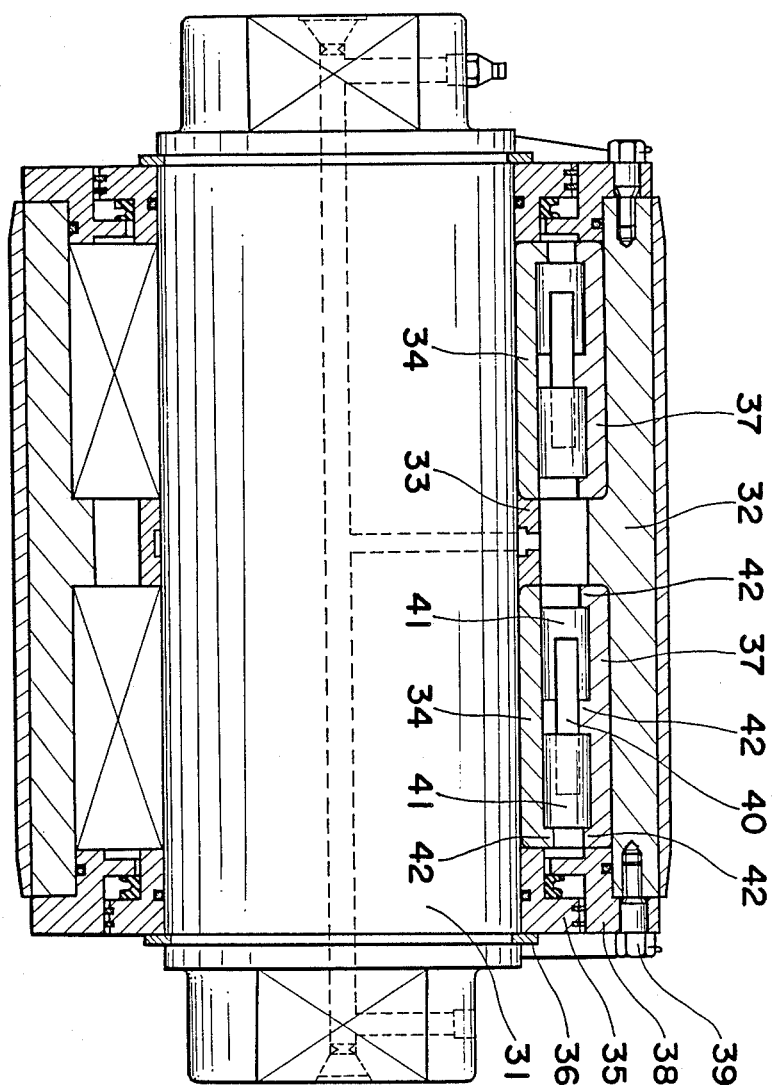
FIG. 3 is a side view of the back-up roll equipped with a conventional bearing device.

The radial load in the radial direction acting constantly between the roll shaft 1 and outer casing 2 of the back-up roll during rolling is received by the cylindrical rollers 3 which move and are fit between the roll shaft 1 and outer casing 2 as in the prior art. Now, when the thrust load in the axial direction acts between the roll shaft 1 and outer casing 2, a load is applied from the cylindrical roller 3 in the axial direction to the outside to the outer ring 11 of the tapered roller bearing 7 which is in contact with these. This load is transmitted in part via the outer ring 11 to the outer casing 2, in part to the roll shaft 1 via the outer ring 11, tapered rollers 13, and inner ring 12, and also in part to the roll shaft 1 via the inner ring 12, seal ring 24, and stop ring 17. Specifically, because the outer ring 11 and inner ring 12 of the tapered roller bearing 7 are so positioned to the outer casing 2 and roll shaft 1, respectively, that the center lines of the tapered rollers 13 intersect the axis of the roll shaft 1, the thrust load acting from the cylindrical rollers 3 on the end of the outer ring 11 is supported in the axial on both the roll shaft 1 and outer casing 2; thus, when compared with the prior art as shown in FIG. 3 in which the thrust load is received locally as shear stress by only flanges 42, the stress acting on each part of the tapered roller bearing 7 is greatly reduced at each part, and stress concentration such as may damage each member does not occur even in the event an excessive stress load is applied. Therefore, a bearing device according to the aforementioned preferred embodiment of the present invention which is equipped with a tapered roller bearing 7 is significantly harder to damage than a conventional device such as illustrated in FIG. 3, there is no danger of the back-up roll itself becoming inoperable due to fragments being caught in cylindrical roller 3, and the usable service life is therefore significantly extended.

In the above preferred embodiment, it was noted that the thrust load acting on the back-up roll of the rolling mill is relatively low at approximately 1/10th the radial load; because the inner ring 12 of the tapered roller bearing 7 was clearance fit to the roll shaft 1 so that the aforementioned radial load is not directly applied to inner ring 12, and the aforementioned thrust load applied from the cylindrical roller 3 to the inner ring 12 via the outer ring 11 and tapered rollers 13 is received by the stop ring 17 via the seal ring 24, the present invention offers the additional benefit of reducing the size and weight and reducing the production cost of tapered roller bearings 7. Moreover, because the tapered roller bearing 7 is shielded from the outside by the side plate 22 and oil seal 23, contamination by dust and foreign matter is prevented, and the usable service life can be extended.

It should also be noted that the tapered roller bearing according to the present invention may also be provided near only one end of the cylindrical roller unlike as is described heretofore with respect to the preferred embodiment, and the inner ring of the tapered roller bearing may also be close fit to the roll shaft.

As will be clear from the preferred embodiment of the present invention as heretofore described, because in a back-up roll in a rolling mill according to the present invention cylindrical rollers are fit between a roll shaft of a back-up roll and an outer casing, an outer ring is fixed to the inside of the outer casing so that it is in contact with the end of said cylindrical rollers, an inner ring is set to the outside of the roll shaft in opposition to the outer ring, tapered rollers are fit between the inner and outer rings, and the thrust load acting on the cylindrical roller is received by a tapered roller bearing consisting of the outer ring, inner ring, and tapered roller, the thrust load is dispersed and supported in both the axial and radial directions on both ends of the roll shaft and outer casing; thus, when compared with the prior art in which the thrust load is received locally only by the flanges of the inner and outer rings, the stress acting on each part of the tpered roller bearing is greatly reduced, each member will not fail even if an excessive thrust load acts during rolling, and the usable service life of the bearing device and therefore the back-up roll can be greatly extended.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A back-up roll in a rolling mill comprising:
   a roll shaft of the back-up roll of the rolling mill;
   an outer casing disposed outside the roll shaft;
   multiple cylindrical rollers fit circumferentially between the roll shaft and the outer casing; and a tapered roller bearing which is provided between the roll shaft and outer casing and juxtaposed to said cylindrical rollers, and which receives a thrust load acting on said cylindrical rollers, wherein said tapered roller bearing is composed of an inner ring fit to an outside of said roll shaft, an outer ring fixed to an inside of said outer casing and in contact with ends of said cylindrical rollers, and multiple tapered rollers fit between the inner and outer rings.

2. A back-up roll in a rolling mill as claimed in claim 1, wherein an axis of each of said tapered rollers intersects an axis of the roll shaft.

3. A back-up roll in a rolling mill as claimed in claim 1, wherein a gap greater than a specified value is provided between the roll shaft and the inner ring.

4. A back-up roll in a rolling mill as claimed in claim 1, wherein a sealing device connected to an outside end face of the inner ring is set at an outside of the roll shaft by a setting member.

5. A back-up roll in a rolling mill as claimed in claim 2, wherein a gap greater than a specified value is provided between the roll shaft and the inner ring.

6. A back-up roll in a rolling mill as claimed in claim 2, wherein a sealing device connected to an outside end face of the inner ring is set at an outside of the roll shaft by a setting member.

7. A back-up roll in a rolling mill as claimed in claim 3, wherein a sealing device connected to an outside end face of the inner ring is set at an outside of the roll shaft by a setting member.

8. A back-up roll in a rolling mill as claimed in claim 5, wherein a sealing device connected to an outside end face of the inner ring is set at an outside of the roll shaft by a setting member.

* * * * *